US012743673B2

(12) United States Patent
Zhou et al.

(10) Patent No.: US 12,743,673 B2
(45) Date of Patent: Sep. 22, 2026

(54) TRAINING AND USING AN INVENTORY ANOMALY PREDICTION MODEL TO PREDICT INVENTORY ANOMALIES

(71) Applicant: Walmart Apollo, LLC, Bentonville, AR (US)

(72) Inventors: Jinyang Zhou, McKinney, TX (US); Karun Dhingra, Rogers, AR (US); Raisa Mukadam, Carrollton, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 114 days.

(21) Appl. No.: 18/393,185

(22) Filed: Dec. 21, 2023

(65) Prior Publication Data

US 2025/0209417 A1 Jun. 26, 2025

(51) Int. Cl.
*G06Q 10/087* (2023.01)

(52) U.S. Cl.
CPC .................................. *G06Q 10/087* (2013.01)

(58) Field of Classification Search
None
See application file for complete search history.

(56) References Cited

U.S. PATENT DOCUMENTS 10,565,546 B2 * 2/2020 Pugh .................. G06Q 30/0222
2017/0039503 A1 * 2/2017 Jones ............. G06Q 10/063114
2018/0365616 A1 * 12/2018 Taylor ............. G06Q 10/06315
2020/0034782 A1 * 1/2020 Hsieh ..................... G06N 3/045
2020/0379805 A1 * 12/2020 Porter ................... G06F 9/5072
2022/0129803 A1 * 4/2022 Bikumala ............. G06F 16/906
2023/0081051 A1 * 3/2023 Brooks ................ G06Q 10/087
705/28

FOREIGN PATENT DOCUMENTS

TW 202204898 A * 2/2022 ........... G01N 33/576

OTHER PUBLICATIONS

Aly, H.G. et al., "Machine Learning Algorithms and Auditor's Assessments of the Risks Material Misstatement: Evidence from the Restatement of Listed London Companies", Information Sciences Letters, 12, No. 4, Apr. 1, 2023, pp. 1285-1298.

* cited by examiner

*Primary Examiner* — Fateh M Obaid
(74) *Attorney, Agent, or Firm* — Foley IP Law, PLLC

(57) ABSTRACT

A computerized method trains an inventory anomaly prediction model and uses the model to predict and address inventory anomalies. Daily inventory data associated with an inventory storage location is obtained from an inventory data store and provided to a pretrained anomaly prediction model as input. The anomaly prediction model generates an anomaly indicator associated with an item type in the obtained inventory data. Corrective action is then caused to be performed in association with the item type and based on the anomaly indicator, whereby inaccuracy of an inventory count of the item type in the inventory data store is corrected. Further, in some examples, the anomaly prediction model is trained using machine learning techniques and training data that is generated and labeled using a tuned outlier detection model. Thus, the method enables the anomaly prediction model to be efficiently trained for accuracy using the described two-stage training process.

14 Claims, 5 Drawing Sheets

TRAINING AND USING AN INVENTORY ANOMALY PREDICTION MODEL TO PREDICT INVENTORY ANOMALIES

BACKGROUND

When associates work on different item-audit worklists for inventory, abnormal behaviors, such as 'pencil whipping' or 'gaming', can result. These behaviors lead to inaccurate inventory data governance which impacts the supplier merchandise forecasting among other aspects of such businesses. It is a challenge to determine when such behaviors have occurred until after the inaccurate inventory item counts have already been relied upon to make important business decisions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training an inventory anomaly prediction model and using the model to predict and address inventory anomalies is described. Daily inventory data associated with an inventory storage location is obtained from an inventory data store and provided to a pretrained anomaly prediction model as input. The anomaly prediction model generates an anomaly indicator associated with an item type in the obtained inventory data. Corrective action is then caused to be performed in association with the item type and based on the anomaly indicator, whereby inaccuracy of an inventory count of the item type in the inventory data store is corrected. Further, in some examples, the anomaly prediction model is trained using machine learning techniques and training data that is generated and labeled using a tuned outlier detection model.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
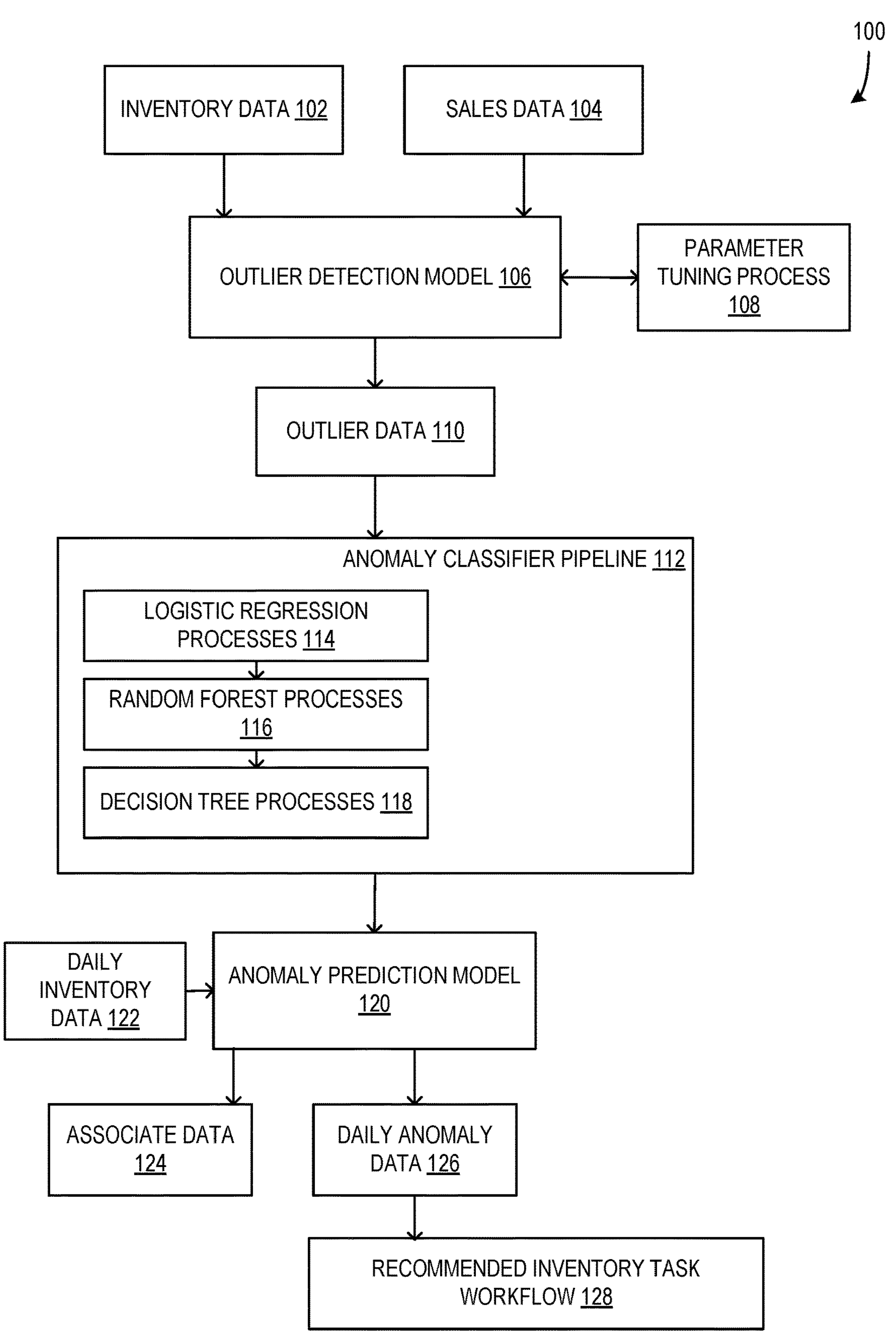
FIG. 1 is a block diagram illustrating a system for predicting inventory anomalies and recommending inventor tasks associated with the predicted inventory anomalies.

Aspects of the disclosure provide systems and methods for training anomaly prediction models and using those models to predict the occurrence of inventory anomalies and thereby cause corrective action to be taken with respect to those inventory anomalies. The anomaly prediction models are trained using a two-stage process that includes an unsupervised learning process that generates labeled training data from unlabeled past inventory data and a supervised learning process that uses that generated labeled training data to ultimately train the anomaly prediction model. Once trained, the anomaly prediction model is provided daily inventory data, and the model analyzes that data and predicts which inventory item data entries are likely to include anomalies such as inaccurate quantity or count values. In response to these predicted anomalies, the disclosed systems and methods cause corrective action(s) to be performed, such as scheduling audits of inventory items that are likely to have inaccurate counts and/or notifying management or other entities of the anomalies and enabling those parties to take necessary action to correct the anomalies.

The disclosure operates in an unconventional manner at least by predicting and/or detecting inventory anomalies using only the inventory data and/or some sales data that is already available. By using the described unsupervised learning process to tune the outlier detection model and to generate the labeled outlier item data, the disclosure efficiently and automatically generates accurate labeled training data that can be used to train the anomaly prediction model as described herein. This initial part of the disclosed process eliminates the need to perform costly and time-consuming manual labeling tasks of existing data to enable the training of the anomaly prediction model. Further, generating the labeled training data in this way reduces the need to determine ways to generate synthetic training data, as the outlier detection model as described herein can be quickly tuned in response to new sets of real data gathered each day.

Further, the disclosure uses a stacked ensemble of three supervised machine learning processes, including logistic regression, random forest, and decision tree processes, to train the anomaly prediction model using the labeled training data. This combination of processes yields an accurate anomaly prediction model while efficiently using processing, memory, and other system resources.

The disclosure enables the overall improvement of the quality of inventory data for a merchant, store, or chain of stores. Further, the disclosure prevents future waste and lost sales. The corrective actions that the disclosure enables do not excessively increase the workloads of associates. For instance, the disclosure enables the corrective action to result in a few accurately targeted inventory audits of specific inventory items, instead of extensive or broad auditing that might be required without the analysis provided by the disclosure.

The disclosed anomaly prediction model, once trained, is configured to quickly and efficiently predict item types that are likely to have anomalous data, thereby reducing the resource costs and time required to perform extensive inventory audit activities that would otherwise be required to ensure accurate collection of inventory data over time.

FIG. 1 is a block diagram illustrating a system 100 for predicting inventory anomalies and recommending inventor tasks associated with the predicted inventory anomalies. In some examples, inventory anomalies at merchant locations, stores, and/or other places where inventories of different items are stored and/or managed occur as a result of inaccurate manual counting of inventoried items therein. For instance, in an example, a person is tasked with taking inventory of a list of different items in a warehouse and that person proceeds to manually count the quantity of each item type on the list. In some cases, such a person makes a mistake in counting, tries to estimate the quantity inaccurately, or otherwise fails to accurately record the quantities of one or more of the item types on the list. Further, in some cases, such a person performs what are known as "pencil whipping" behaviors while counting, which constitutes the person guessing a total amount without taking the time necessarily to accurately count the items, thus recording an inaccurate total quantity for the item that subject to the pencil whipping behavior.

Many business entities perform complex data analysis using inventory data and, when the recorded inventory data is inaccurate, it reduces the usefulness of any insights gained from data analysis. Thus, the system 100 is configured to predict when and for which items inaccurate data may have been recorded based on input inventory data as described herein.

In some examples, the system 100 includes an outlier detection model 106 to which inventory data 102 and/or sales data 104 are provided as input. The outlier detection model 106 is configured to generate outlier data 110 based on the input data, wherein the accuracy of the outlier data 110 is optimized using a parameter tuning process 108 with the outlier detection model 106 as described herein.

Further, in some examples, the outlier data 110, which is comprised of types of categories of inventory items for which the recent recording of quantity data was determined to be an outlier among similar quantity data recordings, is provided to an anomaly classifier pipeline 112. The anomaly classifier pipeline 112 is used to train and fine tune the anomaly prediction model 120 and, in some examples, the anomaly classifier pipeline 112 includes a stacking ensemble of logistic regression processes 114, random forest processes 116, and/or decision tree processes 118 as described herein. In other examples, more, fewer, or different processes are used in the anomaly classifier pipeline 112 without departing from the description.

In some examples, the system 100 is configured to provide the anomaly prediction model 120 for use with daily inventory data 122. The anomaly prediction model 120 analyzes the provided daily inventory data 122 and generates at least daily anomaly data 126. In some examples, it generates other types of data as well, such as the monthly associate data 124. In some such examples, the daily anomaly data 126 indicates one or more inventory item counts from the daily inventory data 122 that are more likely to be inaccurate due to being associated with anomalous count recording events. This daily anomaly data 126 can then be used to provide recommendations as to which inventory item counts should be audited and/or other recommendations associated with other inventory tasks in a recommended inventory task workflow 128. Additionally, or alternatively, in other examples, the system is configured to take other actions (e.g., actions to correct inaccurate item counts and/or to prevent future inaccurate item counts) in response to the daily anomaly data 126 and/or the monthly associate data 124 without departing from the description.

Further, in some examples, the system 100 includes one or more computing devices (e.g., the computing apparatus of FIG. 5) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the outlier detection model 106 is executed on a first computing device and the anomaly classifier pipeline 112 is located on a second computing device within the system 100. The first computing device and second computing device are configured to communicate with each other via network connections. Alternatively, in some examples, other components of the anomaly classifier pipeline 112 (e.g., the logistic regression processes 114, the random forest processes 116, and/or the decision tree processes 118) are executed on separate computing devices and those separate computing devices are configured to communicate with each other via network connections during the operation of the anomaly classifier pipeline 112. In other examples, other organizations of computing devices are used to implement system 100 without departing from the description.

In some examples, the inventory data 102 used with the outlier detection model 106 includes recorded inventory counts of a variety of item types that are stored and/or managed at a location or locations. Further, in some examples, the inventory data 102 includes metadata associated with the inventory items, such as item types, item categories, item price, or the like. Additionally, or alternatively, in some examples, the inventory data 102 includes metadata associated with the item quantity recording events (e.g., the events occurring when a person counts the quantity of an item at a location and records that quantity into a computer system associated with tracking inventory data 102). For instance, in some examples, the inventory data 102 includes data that indicates how long a person took between recording two item count values during the performance of item counting tasks (e.g., using timestamps of the count recording events), a change in item count between a current item count and a previous item count, or the like. Additionally, or alternatively, such metadata includes indicators associated with whether an item is out of stock, manager approval status of changes in quantity of an item, associate identity of the associate performing the counting task, total number of item audits for each associate over time, time difference between two consecutive associate worklists, speed to represent how many items each associated counted per second, or the like. The various variables, fields, and/or parameters of the inventory data 102 are available for use during the analysis of the outlier detection model 106 as described herein, though, in most examples, the outlier detection model 106 is configured to only use a subset of the available inventory data 102. For instance, to boost model performance and avoid potential bias, store or club-specific information is not used as associate IDs already indicate the locations where the associates are working. In some examples, individual item identifiers are not used due to the wide range of different labels and, instead, items are grouped into categories and the category feature of items is used during the tuning and use of the outlier detection model 106.

In some examples, the sales data 104 provided to the outlier detection model 106 includes quantities of items sold on a previous day or during another time period. In other examples, more and/or different sales data 104 is also included. The sales data 104 is used in comparison to the item counts of the inventory data 102 to better identify outliers within the set of items in the inventory data 102. For instance, in an example, the inventory data 102 indicated that an item count was previously 50 and the current count is 30 and the sales data 104 associated with that item indicated that 30 items were sold during the period between counts, then the outlier detection model 106 is configured to include that item as an outlier in the outlier data 110 because the current count of the item does not match with the previous count if the quantity of the item sold in the sales data 104 is accurate.

In some examples, the outlier detection model 106 includes hardware, firmware, and/or software configured to group or cluster items from inventory data based on features of those items and then to identify outliers associated with those item groups or clusters. In some such examples, the outlier detection model 106 is a machine learning (ML) trained model that is trained using real and/or generated training data to improve the accuracy of the model 106 at identifying outliers in the item groups or clusters.

Further, in some examples, the outlier detection model 106 is trained using unsupervised learning. Because the inventory data 102 that is used to train the outlier detection model 106 is not labeled in such a way to indicate whether an item is actually an outlier or not, the patterns that exist in the various data features of the items in the inventory data 102 are used to cluster the items into groups that are most similar. Then, outlier items are determined based on how far items are away from the "center" of each of the determined item groups. In this way, the outlier detection model 106 is configured and trained to identify items that are likely to be outliers and therefore, more likely to need additional auditing to ensure that the count is accurate. For instance, in some examples, such outliers include items for which an associate counted many items in a short period of time or items for which the sales data 104 does not match the change in item count from the inventory data 102.

In some examples, the outlier detection model 106 is configured to use the K-Means cluster method. The K-Means cluster method is a known unsupervised learning method that can be used without knowing the eventual targets of the data. The steps of the K-Means cluster method as it is applied in system 100 are as follows. First, a K quantity of centroids is selected in the inventory data space, which is a conceptual space with dimensions for each item feature and/or variable that is used during the cluster process. The optimal function for this process is provided below as equation 1.

$$J(c, \mu) = \min_{\mu} \min_{c} \sum_{i=1}^{M} \left\| x_i - \mu_{c_i} \right\|^2 \tag{1}$$

Equation 1 is the equation that is optimized during the training and/or tuning of the outlier detection model 106, such that J(c, μ) is minimized. The $x_i$ is an inventory data entry associated with i and the $\mu_{c_i}$ is a cluster centroid of the cluster with which $x_i$ is associated. The equation 1 sums the squared difference values between all M inventory data entries and their associated cluster centroids to arrive at a value that is the minimized over the course of the parameter tuning process 108. In some examples, during the parameter tuning process, equation 2 is used to recursively assign data entries to cluster centroids and then to generate new cluster centroids based on the distribution of data entries around the new cluster centroids as described below.

$$\mu_k^{t+1} \leftarrow \operatorname{argmin}_{\mu} \sum_{i:c_i(t)=k} \|x_i - \mu\|^2 \tag{2}$$

In equation 2, t represents the tth iteration of the tuning loop in which each data entry $x_i$ is recursively assigned to its nearest centroid. Then, new centroids are recalculated based on the data entries that are members of the new clusters. This recursive loop is performed multiple times until the J(c, μ) of equation 1 above reaches a minimum value. The resulting parameters of the clusters are then established for use by other entities of the system 100 as described in greater detail below.

Further, in some examples, the Elbow method is used to determine an optimal quantity of clusters for use with the above-described K-Means cluster method. Equation 3, provided below, is used with the Elbow method.

$$W_k = \sum_{r=1}^{k} \frac{1}{2n_r} D_r \tag{3}$$

In Equation 3, $W_k$ represents the gap statistic of the set of clusters. Further, $n_r$ represents the number of data entries and $D_r$ represents the sum of the squared distances between all points in the cluster r. By visualizing the plot of k vs $W_k$, the cluster number k at the turning point from a curve to a linear graph is the optimal number clusters for use with the above-described K-Means cluster method.

It should be understood that, in other examples, other methods are used to determine the optimal number of clusters and/or other methods are used to perform the cluster process without departing from the description.

In some examples, outliers are defined as data entries that have longer distance from their corresponding cluster centroids when compared with the other data entries in those clusters. For instance, in an example, the outliers of each cluster are those data entries that are in the top 15% of data entries in distance from cluster centroids. These outlier data entries are then included in the outlier data 110 generated by the outlier detection model 106.

Further, in some examples, outliers are determined using specifically defined rules. For instance, in an example, an inventory data entry for which the on-hand quantity value is less than the sold units value on the next day is determined to be an outlier, regardless of its distance from a cluster centroid. In this way, the labeling of outlier data entries can be customized for determinable outlier behaviors in addition to the mathematical distance to cluster centroids method used above.

In some examples, the outlier data 110 includes the inventory data entries from the inventory data 102 with labels assigned that indicate whether each inventory data entry is an outlier or not. Thus, the outlier data 110 is used by the anomaly classifier pipeline 112 to train the anomaly prediction model 120 using the outlier data 110 as training data.

In some examples, the anomaly classifier pipeline 112 includes hardware, firmware, and/or software configured to perform ML processes to train the anomaly prediction model 120 as described herein. In some such examples, the anomaly classifier pipeline 112 includes the performance of logistic regression processes 114, random forest processes 116, and/or decision tree processes 118. Alternatively, or additionally, in other examples, the anomaly classifier pipeline 112 includes more, fewer, and/or different ML processes without departing from the description.

In some examples, the anomaly classifier pipeline 112 is configured to use a stacking ensemble of logistic regression processes 114, random forest processes 116, and decision tree processes 118. The logistic regression process 114 is a statistical method that is used in ML for binary classification problems. The described process is configured to predict whether a data entry belongs to one of two classes, which are an outlier class and a non-outlier class in the described system 100. In some such examples, the logistic regression process 114 uses a sigmoid function shown below in equation 4.

$$p(x) = \frac{1}{1 + e^{-\alpha(x-\beta)}} \quad (4)$$

The sigmoid function of equation 4 includes α representing the learning rate and β representing the coefficients. For each iteration of the process, β is updated based on the gradient of the sigmoid function until it reaches convergence.

Further, in some examples, the random forest processes 116 are configured to construct a plurality of decision trees for classifying data entries as outliers or non-outliers during training and using the average output of the plurality of decision trees as output. In some such examples, the random forest processes 116 generate a combination of decision trees where each tree is optimized by having the smallest Gini impurity with random data and random attributes, where Gini impurity is a measure used to evaluate how often a randomly chosen data entry would be incorrectly classified by the associated trained classifier model. In some cases, Gini impurity is used as a criterion for determining when to split nodes in a decision tree during the process of building a classification tree. Further, in some examples, the decision tree processes 118 include a condition-based algorithm for splitting the input data by optimizing for Gini impurity. It should be understood that, in other examples, more, fewer, or different types of classification models are used in place of or in addition to the classification processes of the anomaly classifier pipeline 112 without departing from the description.

In some examples, the anomaly prediction model 120 is trained as described herein by the anomaly classifier pipeline 112 and, after training, the model 120 is configured to be used to generate daily anomaly data 126 based on daily inventory data 122. In some such examples, the daily inventory data 122 includes counts of inventory items that have been collected by associates in stores and/or other locations. Further, in some examples, the daily inventory data 122 includes other data features or variables as described above with respect to the inventory data 102. For each type of item and/or category of item, associated daily inventory data 122 is provided to the anomaly prediction model 120 as input and the anomaly prediction model 120 generates daily anomaly data 126 that predicts or otherwise classifies the item type or item category as one of an outlier or a non-outlier.

In many cases, the item types or categories that are found to likely be non-outliers do not produce any additional action by the system 100, but for item types and/or categories that are found to be outliers, changes are made to a recommended inventory task workflow 128 or other preventative or corrective actions are taken by the system 100. For instance, in an example, the anomaly prediction model 120 predicts that an item type is likely to be an outlier (e.g., to have an inaccurate count value). The system 100 is configured to automatically add a recommended inventory audit task associated with that item type, such that an associate is instructed to soon perform an audit of the on-hand quantity of items of that item type that are present at the associated location. In some such examples, such recommended tasks are provided as input to an associate task assignment system through which associates receive other similar tasks, including tasks for collecting item count information of types of items in the location.

Additionally, or alternatively, in some examples, the system 100 performs other actions in response to predicting that an item type or category is an outlier. For instance, in an example, the system 100 generates an automatic notification to be sent to a manager or other similar user. Such a notification is sent immediately upon predicting an outlier and/or as part of a report that includes a plurality of such notifications and is sent at a scheduled time during a day or week.

Further, in some examples, the output of the anomaly prediction model 120 is used to generate associate data 124. In some examples, associate data 124 includes information that associates predicted anomalies with associates that were responsible for performing the associated inventory count tasks. Such associate-based data can be used to trigger additional training for associates that get more inaccurate counts than normal or to perform other similar behaviors to address inventory count task issues with specific associates.

Additionally, or alternatively, in some examples, the inventory data 102 and/or sales data 104 provided to the outlier detection model 106 and used to tune the model 106 are updated with new data periodically. When those data sets are updated, the outlier detection model 106 is re-tuned using the parameter tuning process 108 and updated outlier data 110 is generated. An updated version of the anomaly prediction model 120 can then be trained using the updated outlier data 110 and the anomaly classifier pipeline 112, such that the anomaly prediction model 120 is dynamically updated and/or improved over time. For instance, in an example, daily inventory data 122 is added to the inventory data 102 and, when the inventory data 102 is sufficiently different from the previously used inventory data 102, an outlier detection model 106 re-tuning process is triggered. In some examples, such a re-tuning and/or retraining process is performed periodically (e.g., once per week, once per month, or the like).

Figure 2:
FIG. 2 is a flowchart illustrating a method for predicting inventory anomalies and causing corrective action to be performed in response to the predicted inventory anomalies.
Figure 2:
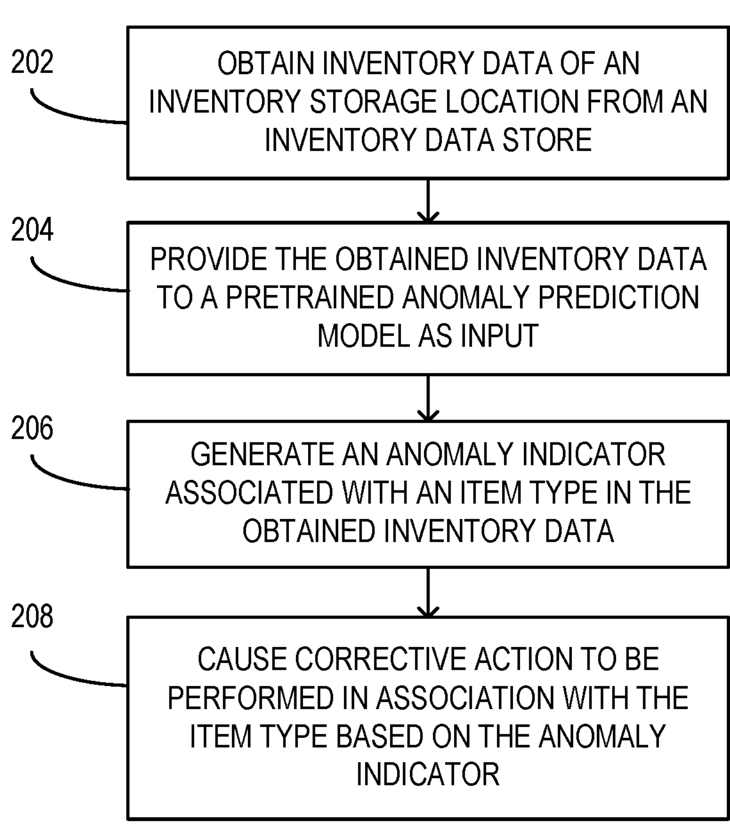

FIG. 2 is a flowchart illustrating a method 200 for predicting inventory anomalies and causing corrective action to be performed in response to the predicted inventory anomalies. In some examples, the method 200 is executed or otherwise performed by or in association with a system such as system 100 of FIG. 1.

At 202, inventory data of an inventory storage location is obtained from an inventory data store. In some examples, the obtained inventory data is daily inventory data 122 as described herein. Further, in some examples, the obtained inventory data includes data entries associated with specific items in inventory, wherein each data entry includes one or more data variables or features associated with the inventory item, such as a count or quantity value representing the most recent quantity of the item in inventory, a datetime value indicating when the count value was recorded, an item category value indicating a category with which the item is associated, or the like.

At 204, the obtained inventory data is provided to a pretrained anomaly prediction model as input. In some examples, the pretrained anomaly prediction model is an anomaly prediction model 120 as described herein. Further, in some examples, the inventory data provided to the pretrained anomaly prediction model includes data features with which the model was trained. For instance, in an example, the pretrained anomaly prediction model was trained to analyze the time spent by associates to count the quantity of an item when recording its most recent count value. In such examples, the inventory data provided to the pretrained anomaly prediction model includes a value indicative of the time spent counting the quantity of the item and/or timestamp data values associated with the times at which the item count value was recorded and at which an item count value of a previously counted item was recorded, whereby a quantity of time taken to count the quantity of the item can be determined or estimated based on the difference between those two timestamps.

At 206, an anomaly indicator associated with an item type in the obtained inventory data is generated by the pretrained anomaly prediction model. In some examples, the generated anomaly indicator is one of a plurality of such indicators in daily anomaly data 126 as described herein. Further, in some examples, the generated anomaly indicator includes additional information about the flagged item type, such as data indicating possible reasons why the anomaly indicator was generated (e.g., insufficient time was spent counting the item quantity, the change in item quantity from day to day does not match the sales data associated with that item type, or the like).

At 208, corrective action is caused to be performed in association with the item type and based on the anomaly indicator. In some examples, the corrective action includes the adding of a task for auditing the item type to a queue of inventory tasks to be performed by associates, such that the quantity of the item type is re-evaluated at some point in the near future. Further, in some examples, the corrective action includes the sending of a notification to a manager or other similar entity that informs the entity of the predicted inventory anomaly associated with the item type and/or other item types for which inventory anomalies are predicted. By sending such a notification or causing such a notification to be sent, the method 200 enables entities at the store or inventory storage location to evaluate the situation using the information in the notification and take further action as needed. Additionally, or alternatively, the corrective action includes recording associate-specific information about the anomaly indicator such that associate performance in performing inventory tasks can be tracked over time.

Figure 3:
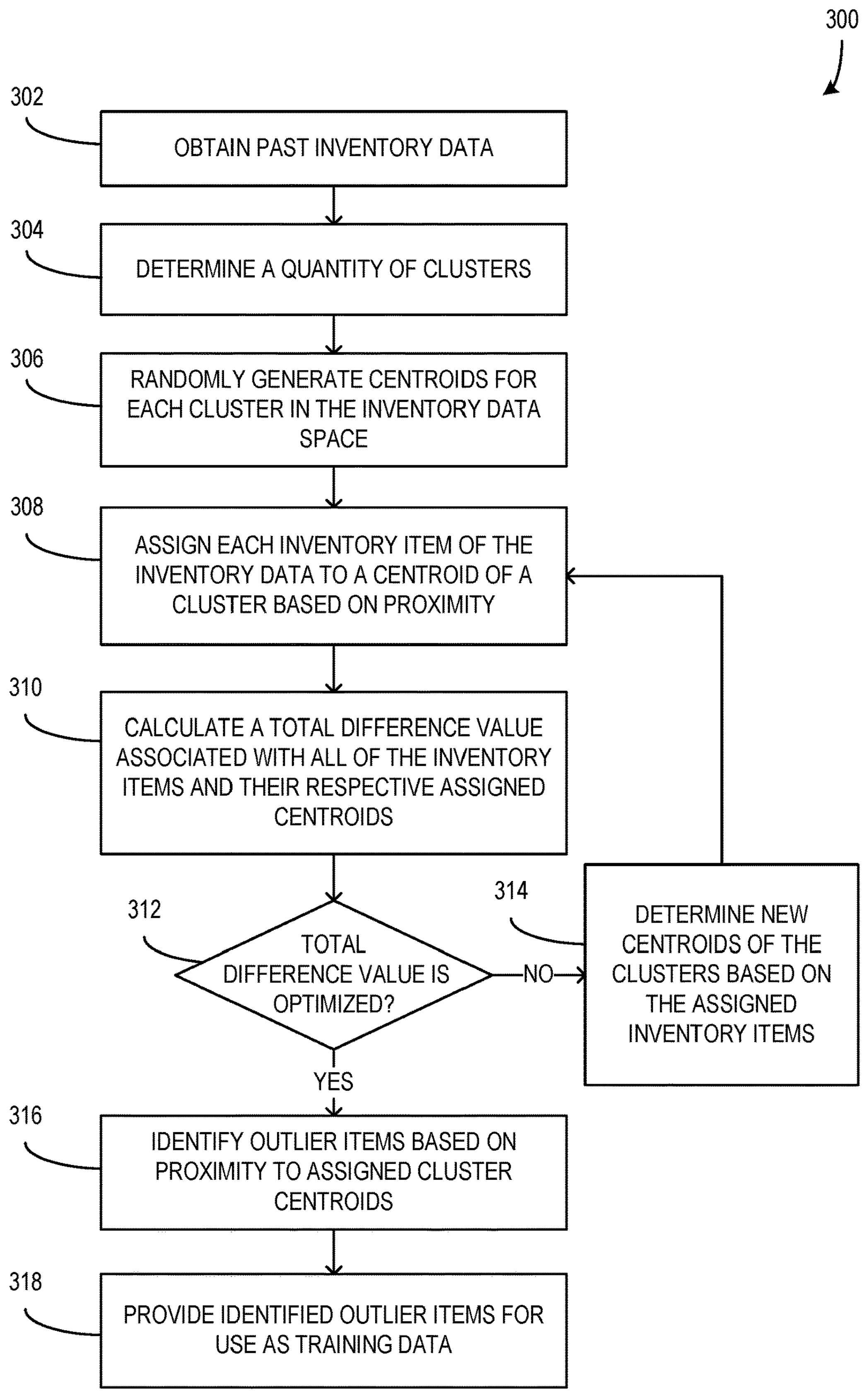
FIG. 3 is a flowchart illustrating a method for optimizing an outlier detection model and for providing outlier items from the model for use as training data.

FIG. 3 is a flowchart illustrating a method 300 for optimizing an outlier detection model 106 and for providing outlier items (e.g., outlier data 110) from the model for use as training data. In some examples, the method 300 is executed or otherwise performed by or in association with a system such as system 100 as described herein. Further, in some examples, the method 300 is performed as part of a method for training an anomaly prediction model 120 which is then used in the method 200 as described herein.

At 302, past inventory data is obtained. In some examples, the past inventory data is obtained from an inventory data store that stores data for one or more inventory storage locations, stores, merchant locations, or the like. Further, in some such examples, the obtained inventory data includes data values associated with a plurality of inventory items or item types, including data that identifies the items, categorizes the items, and/or indicates quantities or counts of items based on manually performed inventory counting tasks. Additionally, in some examples, the obtained inventory data includes metadata associated with the performance of the inventory counting tasks, such as timestamp information associated with when count values are recorded, quantity change values indicating the difference between one count value and a previous count value, or the like. It should be understood that, in some examples, the obtained past inventory data includes the same data features, variables, fields, and/or values as the daily inventory data 122 provided to the anomaly prediction model 120 as described herein.

At 304, a quantity of clusters is determined. In some examples, the inventory item data entries of the obtained inventory data are clustered into some quantity of item clusters during the operation of the outlier detection model 106 as described herein, wherein entries that are in the same cluster tend to be similar to each other with respect to various data features, variables, or values of those entries. For the set of past inventory data, there is a quantity of clusters that should be used to best identify outlier entries that actually are inventory anomalies. In some examples, determining the quantity of clusters to be used is done using the Elbow method as described above. However, in other examples, other methods are used to determine the quantity of clusters without departing from the description.

At 306, centroids for each cluster are randomly generated in the data space. In some examples, the data space is a conceptual space in which each of the data features or variables that are used are represented as a dimension of the space, such that a particular data entry could theoretically be plotted in the data space based on the specific values of its data features and/or variables. For each cluster, there is a centroid, which is a point in the data space that is compared to all data entries in the cluster to evaluate the efficiency of the centroid and the cluster. If the average distance between data entries and the centroid of a cluster is high, then the cluster is inefficient but if the average distance between data entries and the centroid of a cluster is low, then the cluster is efficient. The initial centroids are generated randomly and the method 300 describes how the associated outlier detection model 106 is tuned to improve the efficiency of all the clusters.

At 308, each inventory item/data entry of the past inventory data is assigned to a centroid of a cluster based on proximity. For instance, in an example, each data entry is assigned to the cluster centroid to which it is closest.

At 310, a total difference value is calculated in association with all the inventory items/data entries and their respective assigned centroids. This total difference value is representative of the average efficiency of all of the clusters and associated centroids.

At 312, if the total difference value is not optimized, the process proceeds to 314. Alternatively, if the total difference value is optimized the process proceeds to 316. In some examples, the total difference value is considered optimized when, over the course of multiple loops of the method 300, the differences between consecutively calculated total difference values becomes small and/or approaches zero. For instance, in an example, the total difference value is considered optimized when the differences between consecutively calculated total difference values are less than 1% changes over the past 5 iterations. In other examples, other thresholds and/or iteration counts are used without departing from the description.

At 314, new centroids of the clusters are determined based on the assigned inventory items. In some examples, new centroids are determined by averaging the location in the data space of all the data entries in the associated cluster or otherwise placing the centroid at a point that minimizes the total distance between all the data entries of the cluster and the new centroid. This is performed for all of the cluster centroids.

After the new centroids are determined, the process returns to 308, wherein the inventory item data entries are assigned to one of the new centroids based on proximity again. Because the centroids of the clusters have changed places, it is possible that some of the data entries will not be assigned to different centroids and therefore be in different clusters.

At 316, after the total difference value of the data entries and associated centroids is optimized, the associated outlier detection model 106 is considered to be tuned (e.g., the parameter tuning process 108). Outlier items are identified based on their proximity to assigned cluster centroids. In some examples, the identification of outliers is based on a defined threshold, such as the 15% of the inventory items that are farthest from their assigned centroids. In other examples, other rules or methods are used to determine outlier inventory items using the cluster centroids without departing from the description.

At 318, the identified outlier items are provided for use as training data. Further, in some examples, the past inventory data is combined with the identified outlier items to form training data, wherein the identified outlier items are labeled as outliers and the other inventory items are labeled as non-outliers. In this way, the training data includes data entries in two different labeled categories that can be used to train the anomaly prediction model as described herein.

Figure 4:
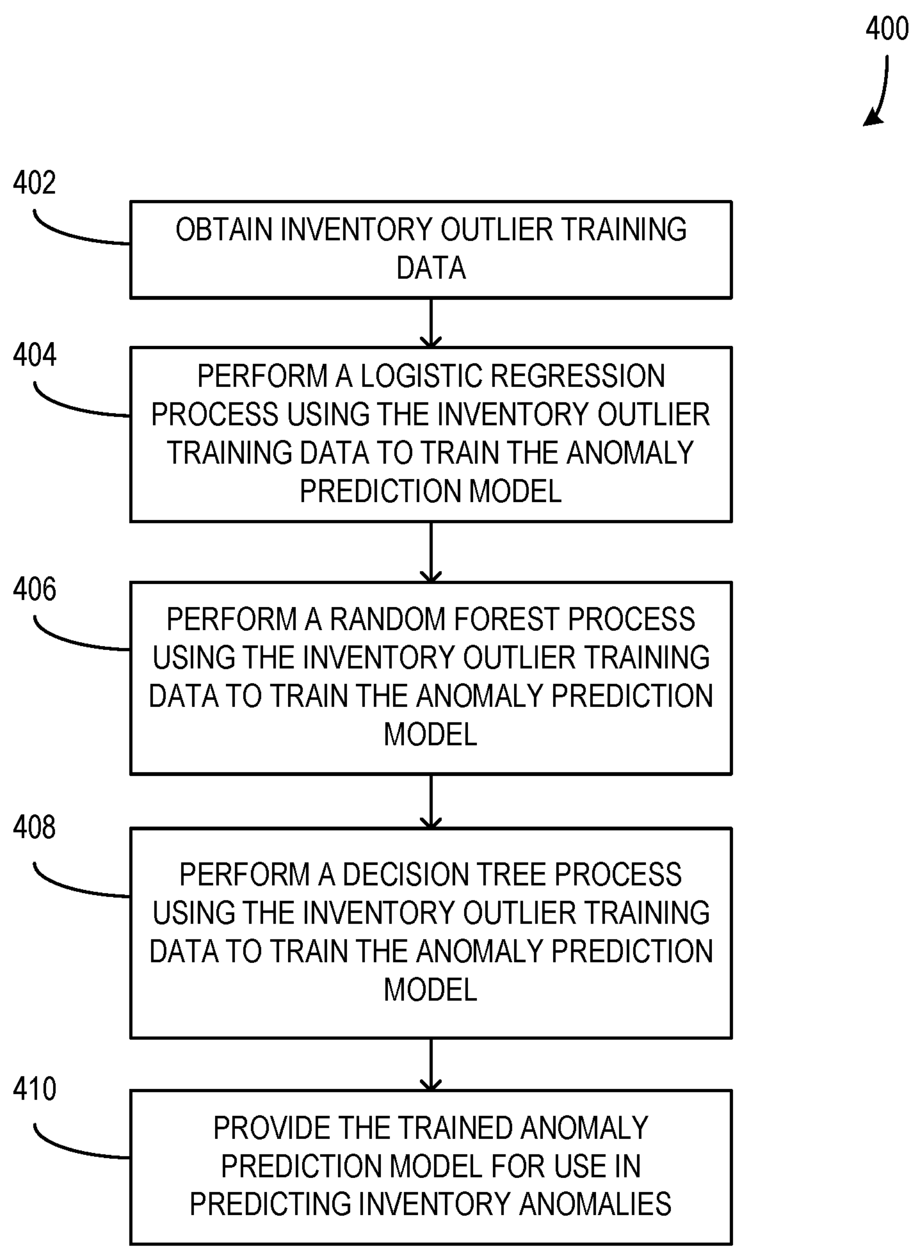
FIG. 4 is a flowchart illustrating a method for training an anomaly prediction model for predicting inventory anomalies in an inventory based on provided inventory data.

FIG. 4 is a flowchart illustrating a method 400 for training an anomaly prediction model 120 for predicting inventory anomalies in an inventory based on provided inventory data. In some examples, the method 400 is executed or otherwise performed in a system such as system 100. Further, in some examples, the method 400 is performed after method 300 and using the outlier training data generated by method 300 to train the anomaly prediction model 120 as described herein.

At 402, inventory outlier training data is obtained. In some examples, the inventory outlier training data includes a plurality of inventory item data entries, including associated data features and variables, wherein each of the inventory item data entries is labeled as either an outlier or a non-outlier.

At 404, a logistic regression process is performed using the inventory outlier training data to train the anomaly prediction model. In some examples, the logistic regression process is performed as described above with respect to logistic regression processes 114.

At 406, a random forest process is performed using the inventory outlier training data to train the anomaly prediction model. In some examples, the random forest process is performed as described above with respect to random forest processes 116.

At 408, a decision tree process is performed using the inventory outlier training data to train the anomaly prediction model. In some examples, the decision tree process is performed as described above with respect to decision tree processes 118.

Further, in some examples, the various processes performed include more, fewer, and/or different machine learning processes performed in a different order without departing from the description.

At 410, the trained anomaly prediction model is provided for use in predicting inventory anomalies. For instance, in some examples, the trained anomaly prediction model is used during the execution of a method such as method 200 of FIG. 2 as described above. Further, in some examples, the trained anomaly prediction model is used as an anomaly prediction model 120 in the generation of the daily anomaly data 126 and/or associate data 124 of FIG. 1 as described above.

Exemplary Operating Environment

Figure 5:
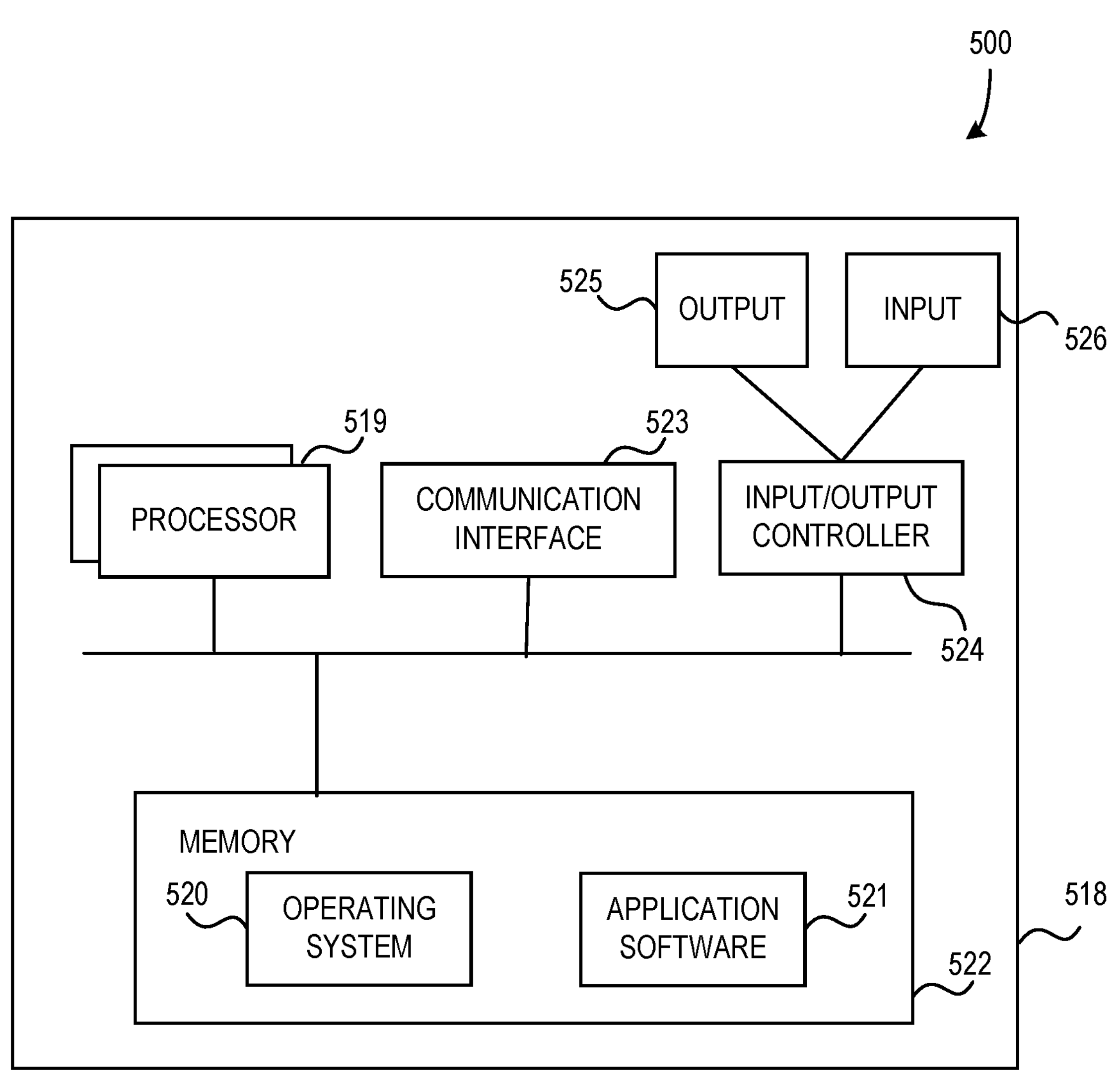
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. In some examples, platform software comprising an operating system 520 or any other suitable platform software is provided on the apparatus 518 to enable application software 521 to be executed on the device. In some examples, training an anomaly prediction model and using the model to predict and address inventory anomalies as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain inventory data of an inventory storage location from an inventory data store; provide the obtained inventory data to a pretrained anomaly prediction model as input; generate, by the pretrained anomaly prediction model, an anomaly indicator associated with an item type in the obtained inventory data; and cause corrective action to be performed in association with the item type based on the anomaly indicator, whereby inaccuracy of an inventory count of the item type in the inventory data store is corrected.

An example computerized method comprises obtaining inventory data of an inventory storage location from an inventory data store; providing the obtained inventory data to a pretrained anomaly prediction model as input; generating, by the pretrained anomaly prediction model, an anomaly indicator associated with an item type in the obtained inventory data; and causing corrective action to be performed in association with the item type based on the anomaly indicator, whereby inaccuracy of an inventory count of the item type in the inventory data store is corrected.

One or more computer storage media having computer-executable instructions that, upon execution by a processor, case the processor to at least: obtain inventory data of an inventory storage location from an inventory data store; provide the obtained inventory data to a pretrained anomaly prediction model as input; generate, by the pretrained anomaly prediction model, an anomaly indicator associated with an item type in the obtained inventory data; and cause corrective action to be performed in association with the item type based on the anomaly indicator, whereby inaccuracy of an inventory count of the item type in the inventory data store is corrected.

Alternatively, or in addition to the other examples described herein, examples include any combination of the following:

further comprising: obtaining past inventory data from the inventory data store; generating a plurality of item clusters using the obtained past inventory data and an outlier detection model; tuning parameters of the outlier detection model using the generated plurality of item clusters; labeling a subset of inventory items in the past inventory data as outlier items using the generated plurality of item clusters; and training the anomaly prediction model using machine learning to predict outlier inventory items using the past inventory data and the labeled subset of inventory items as training data.

wherein tuning parameters of the outlier detection model using the generated plurality of item clusters includes: determining a quantity of clusters to be generated; determining, for each cluster, a cluster centroid; assigning each inventory item in the past inventory data to a cluster based on the inventory item being most similar to the cluster centroid of the cluster; calculating a total difference value as a sum of difference values between the inventory items of the past inventory data and the cluster centroids of the clusters to which the inventory items are assigned; adjusting the cluster centroids of the clusters one or more times; and minimizing the calculated total difference value using the adjustments to the cluster centroids.

wherein labeling a subset of inventory items in the past inventory data as outlier items using the generated plurality of item clusters further includes: identifying an item count change value of an inventory item in the past inventory data, wherein the item count change value indicates a difference between a first inventory item count of the inventory item and a second inventory item count of the inventory item which occurred after the first inventory item count; determining a sale quantity value of the inventory item in past sales data, wherein the sale quantity value indicates a quantity of the inventory items sold during a time period; determining a difference between the identified item count change value and the determined sale quantity value of the inventory item; and based on the determined difference between the identified item count change value and the determined sale quantity value, labeling the inventory item as an outlier item.

wherein training the anomaly prediction model using machine learning to predict outlier inventory items using the past inventory data and the labeled subset of inventory items as training data includes: performing a logistic regression process using the past inventory data and the labeled subset of inventory items; performing a random forest process using the past inventory data and the labeled subset of inventory items; and performing a decision tree process using the past inventory data and the labeled subset of inventory items, whereby the anomaly prediction model is trained during the performing of the logistic regression process, the random forest process, and the decision tree process.

wherein generating a plurality of item clusters using the obtained past inventory data and an outlier detection model includes using a K-Means cluster method to generate the plurality of item clusters.

causing the corrective action to be performed in association with the item type with which the anomaly indicator is associated includes at least one of the following: scheduling an audit task to be performed in association with the item type; and sending a notification associated with the generated anomaly indicator.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining inventory data of an inventory storage location from an inventory data store; an exemplary means for providing the obtained inventory data to a pretrained anomaly prediction model as input; an exemplary means for generating, by the pretrained anomaly prediction model, an anomaly indicator associated with an item type in the obtained inventory data; and an exemplary means for causing corrective action to be performed in association with the item type based on the anomaly indicator, whereby inaccuracy of an inventory count of the item type in the inventory data store is corrected.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory storing programming instructions for execution by the processor, the programming instructions, upon execution by the processor, causing the processor to:

label a subset of inventory items in past inventory data as outlier items;

train an anomaly prediction model using machine learning to predict outlier inventory items using the past inventory data and the labeled subset of inventory items as training data;

obtain, from an inventory data store, inventory data indicating an inventory count of items associated with an item type, the inventory data including metadata indicating an amount of time spent counting the items by user(s) to determine the inventory count, wherein the inventory count of the items has changed over a period of time;

obtain sales data for the item type, the sales data indicating a number of items associated with the item type that were sold during the period of time;

provide the inventory data and the sales data as an input to the trained anomaly prediction model;

detect, by the trained anomaly prediction model, an anomaly indicating an inaccuracy of the inventory count of the item type in the inventory data based on both (i) a difference between the change in the inventory count and the number of items sold and (ii) the amount of time spent counting the items being less than a threshold; and send, in response to detecting the anomaly, an instruction to conduct an inventory audit of the item type to correct the inventory count of the item type in the inventory data store.

2. The system of claim 1, wherein the programming instructions further cause the processor to:

generate, by an outlier detection model, item clusters using the past inventory data, wherein the outlier detection model is a machine learning (ML) model that is trained to improve the accuracy of the trained anomaly prediction model at detecting anomalies; and tune parameters of the outlier detection model using the item clusters.

3. The system of claim 2, wherein tuning the parameters of the outlier detection model using the item clusters includes:

determining cluster centroids for the item clusters;

assigning inventory items of the past inventory data to the item clusters based on proximities of the inventory items to the cluster centroids of the assigned item clusters;

adjusting the cluster centroids of the clusters based on locations of the assigned inventory items; and reassigning the inventory items of the past inventory data to the item clusters based on proximities of the inventory items to the cluster centroids of the item clusters, wherein the adjusting and reassigning steps are repeated until a sum of differences between the proximities of the inventory items to the cluster centroids of the assigned item clusters satisfies a criteria, and wherein the parameters of the outlier detection model are tuned based on a final version of the item clusters.

4. The system of claim 2, wherein training the anomaly prediction model includes:

performing a logistic regression process using the past inventory data and the labeled subset of inventory items;

performing a random forest process using the past inventory data and the labeled subset of inventory items; and performing a decision tree process using the past inventory data and the labeled subset of inventory items, wherein the anomaly prediction model is trained based on the logistic regression process, the random forest process, and the decision tree process.

5. The system of claim 2, wherein generating the item clusters using the past inventory data includes using a K-Means cluster method to generate the item clusters.

6. A computerized method comprising:

labeling a subset of inventory items in past inventory data as outlier items;

training an anomaly prediction model using machine learning to predict outlier inventory items using the past inventory data and the labeled subset of inventory items as training data;

obtaining, from an inventory data store, inventory data indicating an inventory count of items associated with an item type, the inventory data including metadata indicating an amount of time spent counting the items by user(s) to determine the inventory count, wherein the inventory count of the items has changed over a period of time;

obtaining sales data for the item type, the sales data indicating a number of items associated with the item type that were sold during the period of time;

providing the inventory data and the sales data as an input to the trained anomaly prediction model;

detecting, by the trained anomaly prediction model, an anomaly indicating an inaccuracy of the inventory count of the item type in the inventory data based on both (i) a difference between the change in the inventory count and the number of items sold and (ii) the amount of time spent counting the items being less than a threshold; and sending, in response to detecting the anomaly, an instruction to conduct an inventory audit of the item type to correct the inventory count of the item type in the inventory data store.

7. The computerized method of claim 6, further comprising:

generating, by the outlier detection model, item clusters using the past inventory data, wherein the outlier detection model is a machine learning (ML) model that is trained to improve the accuracy of the trained anomaly prediction model at detecting anomalies; and tuning parameters of the outlier detection model using the item clusters.

8. The computerized method of claim 7, wherein tuning parameters of the outlier detection model using the item clusters includes:

determining cluster centroids for the item clusters;

assigning inventory items of the past inventory data to the item clusters based on proximities of the inventory items to the cluster centroids of the assigned item clusters;

adjusting the cluster centroids of the clusters based on locations of the assigned inventory items; and reassigning the inventory items of the past inventory data to the item clusters based on proximities of the inventory items to the cluster centroids of the item clusters, wherein the adjusting and reassigning steps are repeated until a sum of differences between the proximities of the inventory items to the cluster centroids of the assigned item clusters satisfies a criteria, and wherein the parameters of the outlier detection model are tuned based on a final version of the item clusters.

9. The computerized method of claim 7, wherein training the anomaly prediction model includes:

performing a logistic regression process using the past inventory data and the labeled subset of inventory items;

performing a random forest process using the past inventory data and the labeled subset of inventory items; and performing a decision tree process using the past inventory data and the labeled subset of inventory items, wherein the anomaly prediction model is trained based on the logistic regression process, the random forest process, and the decision tree process.

10. The computerized method of claim 7, wherein generating the item clusters using the past inventory data includes using a K-Means cluster method to generate the item clusters.

11. A computer storage medium having programming instructions stored thereon that, upon execution by a processor of a system, cause the processor to:

label a subset of inventory items in past inventory data as outlier items;

train an anomaly prediction model using machine learning to predict outlier inventory items using the past inventory data and the labeled subset of inventory items as training data;

obtain, from an inventory data store, inventory data indicating an inventory count of items associated with an item type, the inventory data including metadata indicating an amount of time spent counting the items by user(s) to determine the inventory count, wherein the inventory count of the items has changed over a period of time;

obtain sales data for the item type, the sales data indicating a number of items associated with the item type that were sold during the period of time;

provide the inventory data and the sales data as an input to the trained anomaly prediction model;

detect, by the trained anomaly prediction model, an anomaly indicating an inaccuracy of the inventory count of the item type in the inventory data based on both (i) a difference between the change in the inventory count and the number of items sold and (ii) the amount of time spent counting the items being less than a threshold; and send, in response to detecting the anomaly, an instruction to conduct an inventory audit of the item type to correct the inventory count of the item type in the inventory data store.

12. The computer storage medium of claim 11, wherein the programming instructions further cause the processor to:

generate, by the outlier detection model, item clusters using the past inventory data, wherein the outlier detection model is a machine learning (ML) model that is trained to improve the accuracy of the trained anomaly prediction model at detecting anomalies; and tune parameters of the outlier detection model using the item clusters.

13. The computer storage medium of claim 12, wherein tuning parameters of the outlier detection model using the item clusters includes:

determining cluster centroids for the item clusters;

assigning inventory items of the past inventory data to the item clusters based on proximities of the inventory items to the cluster centroids of the assigned item clusters;

adjusting the cluster centroids of the clusters based on locations of the assigned inventory items; and reassigning the inventory items of the past inventory data to the item clusters based on proximities of the inventory items to the cluster centroids of the item clusters, wherein the adjusting and reassigning steps are repeated until a sum of differences between the proximities of the inventory items to the cluster centroids of the assigned item clusters satisfies a criteria, and wherein the parameters of the outlier detection model are tuned based on a final version of the item clusters.

14. The computer storage medium of claim 12, wherein training the anomaly prediction model includes:

performing a logistic regression process using the past inventory data and the labeled subset of inventory items;

performing a random forest process using the past inventory data and the labeled subset of inventory items; and performing a decision tree process using the past inventory data and the labeled subset of inventory items, wherein the anomaly prediction model is trained based on the logistic regression process, the random forest process, and the decision tree process.

* * * * *